United States Patent [19]

Cowett, Jr.

[11] Patent Number: 5,404,093
[45] Date of Patent: Apr. 4, 1995

[54] LOW DISTORTION ALTERNATING CURRENT OUTPUT ACTIVE POWER FACTOR CORRECTION CIRCUIT USING CAPACITOR COUPLED BI-DIRECTIONAL SWITCHING REGULATOR

[75] Inventor: Philip M. Cowett, Jr., Baltimore, Md.

[73] Assignee: Allied Signal Inc., Morris Township, Morris County, N.J.

[21] Appl. No.: 863

[22] Filed: Jan. 5, 1993

[51] Int. Cl.$^6$ ............................................. H02M 1/12
[52] U.S. Cl. ..................................... 323/207; 363/34; 363/39; 363/79
[58] Field of Search ............... 323/205, 207, 265, 282, 323/349, 351; 363/39–43, 95, 131, 79

[56] References Cited

U.S. PATENT DOCUMENTS

| | | | |
|---|---|---|---|
| 4,130,861 | 12/1978 | LaForest | 363/39 |
| 4,529,925 | 7/1985 | Tanaka et al. | 323/207 |
| 4,651,265 | 3/1987 | Stacey et al. | 363/35 |
| 4,677,366 | 6/1987 | Wilkinson et al. | 323/222 |
| 4,780,660 | 10/1988 | Shima et al. | 323/207 |
| 5,047,912 | 9/1991 | Pelly | 363/89 |
| 5,057,990 | 10/1991 | Gulczynski | 363/131 |
| 5,291,119 | 3/1994 | Cowett, Jr. | 323/207 |

OTHER PUBLICATIONS

Micro Linear; "1990 Data Book, Semi-Standard Analog", ML4812 pp. 5-20 through 5-30, Sep. 1989.
Sola, "User's Handbook for the 57 Series"; Nov. 11, 1989, pp. 1-1 through 1-7.
Lloyd H. Dixon, Jr., "High Power Factor Preregulators for Off-Line Power Supplies"; Copyright 1988, pp. 6-1 through 6-16.

Primary Examiner—Steven L. Stephan
Assistant Examiner—Adolf Berhane
Attorney, Agent, or Firm—Howard G. Massung

[57] ABSTRACT

A circuit wherein a current sensing device is incorporated in an AC input line. An AC output is taken from the output of the current sensing device and from an other AC input line. Circuitry including a capacitor coupled bi-directional switching regulator and an energy storing capacitor adds current to or subtracts current from the instantaneous output load current. The arrangement is such that the AC output is equal to the AC input with no regulation effect. Substantially one hundred percent efficiency results when very little power factor correction is required.

8 Claims, 3 Drawing Sheets

LOW DISTORTION ALTERNATING CURRENT OUTPUT ACTIVE POWER FACTOR CORRECTION CIRCUIT USING CAPACITOR COUPLED BI-DIRECTIONAL SWITCHING REGULATOR

CROSS REFERENCE TO RELATED APPLICATIONS

This application is related to co-pending, commonly assigned U.S. application Ser. No. 085/000,862 filed by the present inventor on Jan. 5, 1993 for a Low Distortion Alternating Current Output Active Power Factor Correction Circuit Using Bi-directional Bridge Rectifier and Switching Regulator, and U.S. Pat. No. 5,291,119 issued on Mar. 1, 1994 to the present inventor for a Low Distortion Alternating Current Output Active Power Factor Correction Circuit Using Two Bi-directional Switching Regulators.

BACKGROUND OF THE INVENTION

Direct current (DC) output active power factor correction circuits are known in the art. However, prior to the present invention, alternating current (AC) output active power factor correction circuits were not considered viable. Accordingly, this invention relates to modifying the prior art DC circuits to provide an AC output.

In DC output circuits of the type described, a bulk energy storage capacitor is used and charging current into the bulk energy storage capacitor is proportional to the square of the instantaneous AC input line voltage. The current extracted from the AC line is proportional to the instantaneous AC line voltage.

In operation, the AC input or line voltage is full wave rectified by a diode bridge rectifier to provide a rectified sine wave or unfiltered DC output. This output is applied to the input of a switching regulator which is typically a boost converter having an output which is greater than the highest peak input voltage. The feedback loop which regulates the output voltage is modified by adding circuitry to multiply the output of its error amplifier by a sample of the rectified AC input voltage, and comparing this with the sensed current. The resultant signal is used to control the instantaneous duty-cycle of the switching regulator. This causes the input current waveform to follow the input voltage waveform, resulting in low harmonic distortion and a current waveform which is in phase with the voltage waveform.

In order to provide an AC output, the arrangement described above is modified in accordance with the present invention as will be hereinafter described and features a capacitor coupled bi-directional switching regulator. This is in contrast to the arrangement disclosed and claimed in the aforenoted U.S. application Ser. No. 08/008,862 which features a bi-directional bridge rectifier followed by a bi-directional switching regulator for providing the AC output, and to the arrangement disclosed and claimed in the aforenoted U.S. Pat. No. 5,291,119 which features two bi-directional switching regulators for providing said AC output.

SUMMARY OF THE INVENTION

This invention contemplates a low distortion AC output active power factor correction circuit wherein a current sensing device is incorporated in an AC input line. The AC output is taken from the output of said current sensing device, and from an other AC input line. Circuitry including a capacitor coupled bi-directional switching regulator and an energy storage capacitor monitors the instantaneous input current and voltage, and causes current to be added to or subtracted from the external load current to produce an input current which is proportional to the input voltage. The energy storage capacitor provides an auxiliary regulated DC output which may be utilized if desired. With an arrangement of the type described, an AC output voltage is provided which is equal to the input voltage (no regulation effect). Substantially one hundred percent efficiency results when very little power factor correction is required, since the load current does not flow through anything but the current sensing device.

DETAILED DESCRIPTION OF THE INVENTION

Figure 1:
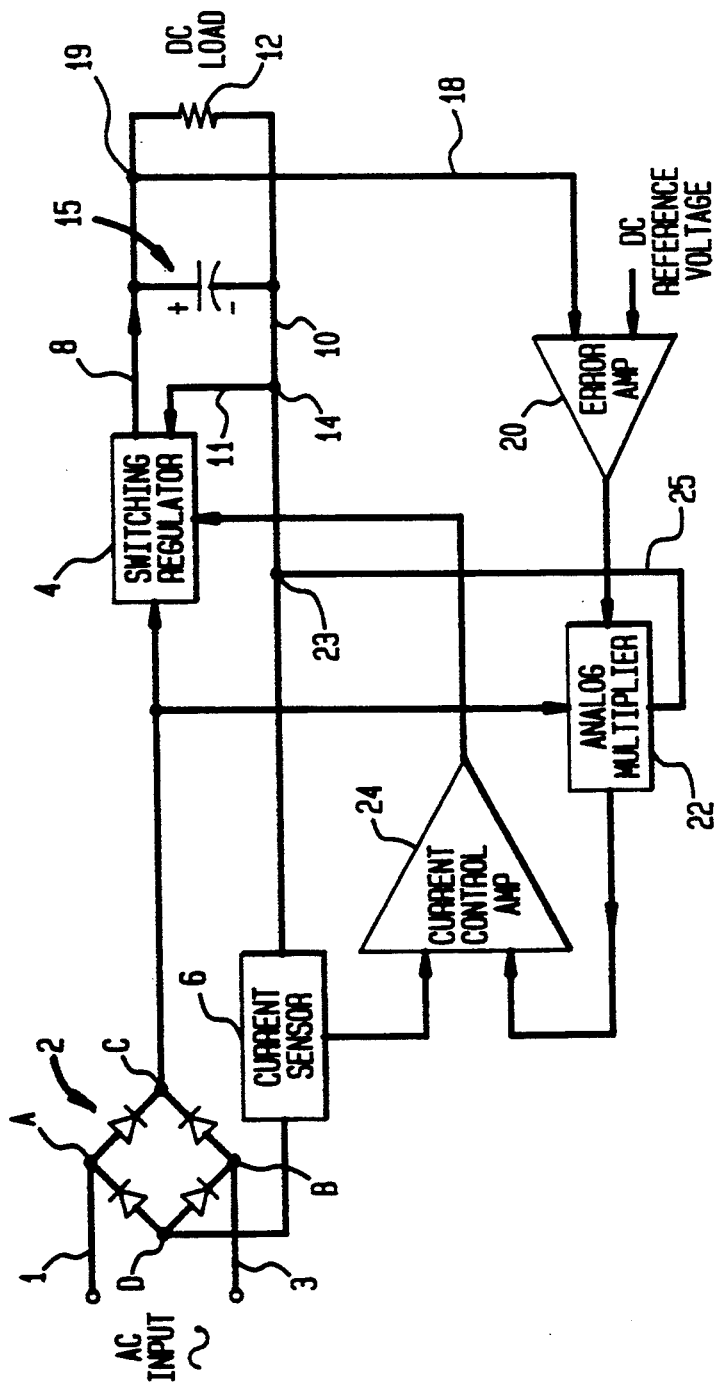
FIG. 1 is an electrical schematic diagram illustrating a prior art DC output power factor correction circuit.

With reference to the prior art circuit shown in FIG. 1, an AC input voltage across input lines 1 and 3 is applied to input terminals A and B of a full wave diode bridge rectifier 2. Bridge rectifier 2 provides a rectified sine voltage output at output terminals C and D thereof.

The output voltage at output terminal C of rectifier 2 is applied to a switching regulator 4 which may be a conventional unidirectional boost converter. The output of bridge rectifier 2 at output terminal D is applied to a 10 current sensor 6.

Switching regulator 4 is connected to an output conductor 8 and current sensor 6 is connected to an output conductor 10. A DC load 12 is connected across conductors 8 and 10. The output from current sensor 6 is applied to switching regulator 4 via conductor 10 and a conductor 11 connected to conductor 10 at a circuit point 14.

A bulk energy storage capacitor 15 is connected across conductors 8 and 10 between circuit point 14 and DC load 12.

A conductor 18 is connected to conductor 8 at a circuit point 19 between capacitor 15 and DC load 12, and is connected to an error amplifier 20. A DC reference voltage is applied to error amplifier 20 which provides an output corresponding to the difference between the input thereto applied via conductor 18 and the reference voltage. The difference output is applied to an analog multiplier 22. Analog multiplier 22 is connected to conductor 10 at a circuit point 23 via a conductor 25.

The output at output terminal C of bridge rectifier 2 is applied to analog multiplier 22. The analog multiplier provides an output which is applied to a current control amplifier 24, as is the output from current sensor 6. Current control amplifier 24 provides an output which is applied to switching regulator 4.

In the circuit shown in FIG. 1, the charging current into bulk energy storage capacitor 15 is proportional to the square of the instantaneous line voltage across AC input lines 1 and 3. The current extracted from the AC input lines is proportional to the instantaneous line voltage.

In operation, the AC input to bridge circuit 2 is full wave rectified by the bridge circuit and the bridge circuit output is in the form of a rectified sine wave, i.e. an unfiltered DC. The unfiltered DC output is applied to the input of switching regulator 4 and a feedback loop including current control amplifier 24 regulates the output from the switching regulator. The feedback loop is modified by multiplying the output of error amplifier 20 by the output at output terminal C of bridge rectifier 2 via analog multiplier 22 and comparing this via current control amplifier 24 with the sensed current from current sensor 6. This causes the input current waveform to follow the input voltage waveform, resulting in low harmonic distortion and a current waveform which is in-phase with the voltage waveform.

Figure 2:
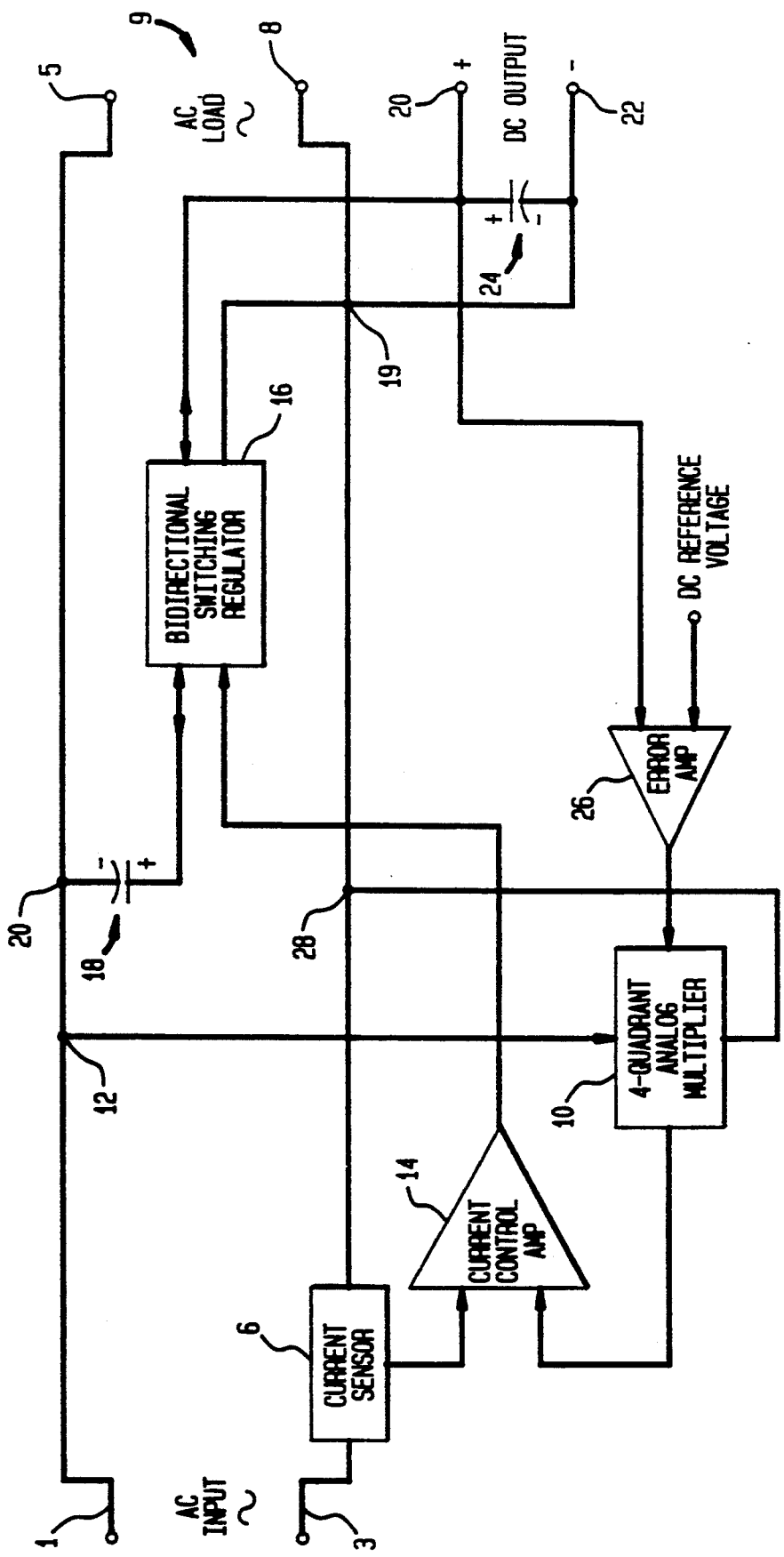
FIG. 2 is an electrical schematic diagram illustrating the invention.

The prior art circuit shown in FIG. 1 is modified as shown in FIG. 2 to provide an AC output in accordance with the present invention, as will be next described.

With reference then to FIG. 2, the AC input voltage across input lines 1 and 3 is applied via line 1 to an output terminal 5 and is applied through a current sensor 6 and a conductor 7 to an output terminal 8. An AC load 9 is connected across output terminals 5 and 8.

A four quadrant analog multiplier 10 is connected to input line 1 at a circuit point 12. Multiplier 10 provides an output which is applied to a current control amplifier 14. Current sensor 6 likewise provides an output which is applied to the current control amplifier. Current amplifier 14 provides an output which is applied to a bi-directional switching regulator 16.

A coupling capacitor 18 is connected to a circuit point 20 between circuit point 12 and output terminal 5 and is connected to bi-directional switching regulator 16.

Bi-directional switching regulator 16 is connected to conductor 7 at a circuit point 19 and is connected to a DC output terminal (+) 20. A DC output terminal (−) 22 is connected to circuit point 19.

A bulk storage capacitor 24 is connected across DC output terminals 20 and 22.

An error amplifier 26 is connected to DC output terminal 20 and a DC reference voltage is applied to the error amplifier. Error amplifier 26 provides a difference output which is applied to four quadrant analog multiplier 10. Analog multiplier 10 is connected to conductor 7 at a circuit point 28.

In operation, a capacitor coupled bi-directional switching regulator is used. The output from current sensor 6 is bi-polar and therefore analog multiplier 10 must be a four quadrant analog multiplier, as aforenoted. Bi-directional switching regulator 16 may be, for purposes of illustration, a bi-directional boost converter as shown and described in the aforenoted co-pending U.S. application Ser. No. 05/000,862, said description being incorporated herein by reference.

It will be appreciated that if another bi-directional switching regulator topology is used, a diode arrangement or the like may be required to set the DC input to the bi-directional switching regulator so that the instantaneous input voltage is always greater than zero and less than the voltage across bulk storage capacitor 24. In this regard, reference is made to FIG. 3 wherein elements corresponding to elements in FIG. 2 carry corresponding numerical designations.

Figure 3:
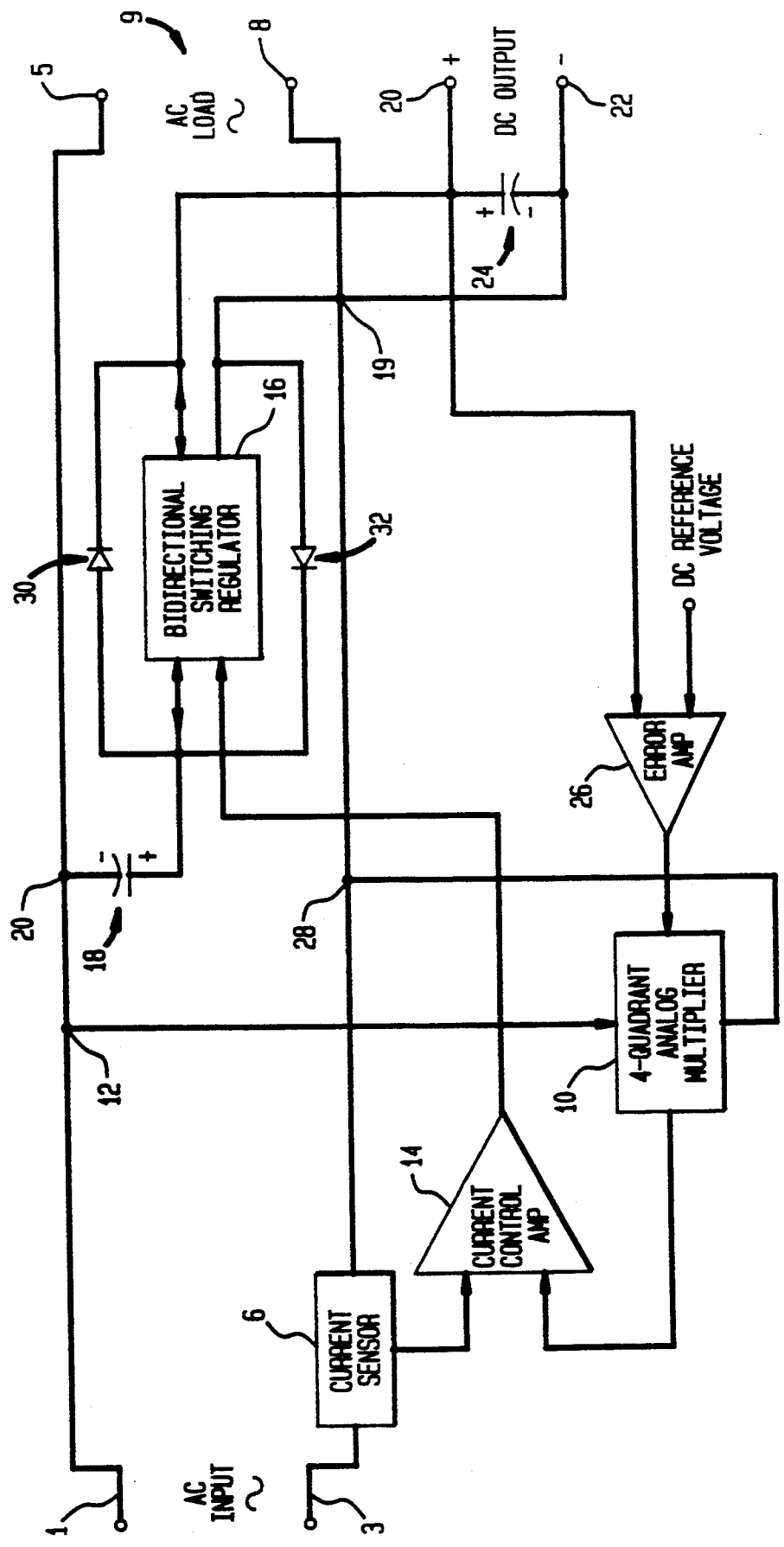
FIG. 3 is an electrical schematic diagram illustrating an arrangement for setting a direct current input to a bi-directional switching means shown in FIG. 2.

Thus, FIG. 3 shows a diode 30 having an anode connected between the positive (+) terminal of capacitor 18 and bi-directional switching regulator 16 and a cathode connected to the positive (+) terminal of capacitor 24. A diode 32 has a cathode connected between the positive terminal of capacitor 18 and bi-directional switching regulator 16 and an anode connected to the negative (−) terminal of capacitor 24.

With continued reference to FIG. 2, capacitor 18 may be replaced with a conductor. Another bulk energy storage capacitor such as capacitor 24 may be connected in series with the output return of the bi-directional switching regulator, shown in FIG. 2 as connected to the conductor connecting current sensor 6 with the negative (−) terminal of capacitor 24. The bi-directional switching regulator would then provide a positive and negative output, with the negative output appearing at the bi-directional switching regulator return. In this event, means would have to be provided for regulating the negative output. This means could take the form of a control loop or switching scheme, as the case may be.

It will now be appreciated that the invention as described and shown with reference to FIG. 2 has distinct advantages. For example, an output voltage equal to the input voltage is provided (no regulation effect). Totally failsafe operation can be accomplished if fuses and circuit breakers are strategically located and if current sensor 6 is sufficiently rugged (e.g. a one turn transformer primary of No. 12 wire in series with AC input line 3). Further, no inherent energy storage is realized. That is to say, the output disappears at the instant the input disappears.

With further reference to FIG. 2, an optional or auxiliary DC output which could be of use if DC outputs as well as AC outputs are required can be accomplished. This is provided by taking the DC output across capacitor 24 as shown in the Figure. There is inherent energy storage at this output.

Additionally, substantially one hundred percent efficiency, with little power factor correction required, will be realized. In this regard, note that the load current does not flow through bi-directional switching regulator 16.

It will be appreciated that AC load 9 could have a leading or lagging power factor, or can be an in-phase but pulsed load, such as those representative of uncorrected switching power supplies. While the design of the circuit shown in FIG. 2 could be optimized for a specific type of load, the invention herein described is of a generic nature and is capable of handling a load of any type.

With the above description of the invention in mind, reference is made to the claims appended hereto for a definition of the scope of the invention.

What is claimed is:

1. A low distortion alternating current active power factor correction circuit, comprising:
   a pair of alternating current input lines;
   bi-directional switching regulator means;
   means for coupling the bi-directional switching regulator means to one of the alternating current input lines with the bi-directional switching regulator means providing a bi-directional output at an output conductor;
   a current sensor connected to the other of the pair of alternating current input lines and providing an output at an output conductor;

the bi-directional switching regulator means connected to the current sensor output conductor;

a bulk energy storing capacitor connected across the bi-directional switching regulator means output conductor and the current sensor output conductor, with a direct current output being provided across said capacitor;

a power factor corrected alternating current output being provided across the one alternating current input line and the current sensor output conductor for being connected to an alternating current load; and means connected to the coupling means, the bi-directional switching regulator means and the bulk energy storing capacitor for setting a direct current input to said regulator means so that the instantaneous input voltage thereto is always greater than zero and less than the voltage across said bulk storage capacitor.

2. A circuit as described by claim 1, including:

an error amplifier connected to the bi-directional switching regulator means output conductor for receiving the bi-directional output;

a reference voltage input received by the amplifier;

said error amplifier providing an output corresponding to a difference between the received inputs; and a multiplier connected to the one of the input lines, the current sensor output conductor and the error amplifier for multiplying the difference output from the error amplifier and for providing a multiplied output which is used for controlling the bi-directional switching regulator means.

3. A circuit as described by claim 2, including:

current control amplifier means connected to the multiplier and to the current sensor and responsive to the outputs therefrom for providing a controlling output; and the bi-directional switching regulator means connected to the current control amplifier means for being controlled by the controlling output therefrom.

4. A circuit as described by claim 1, wherein:

the means for coupling the bi-directional switching regulator means to one of the alternating current input lines includes a capacitor.

5. A circuit as described by claim 4, wherein the coupling capacitor includes:

a first terminal connected in one sense to the one of the alternating current input lines; and a second terminal connected in an opposite sense to the bi-directional switching regulator means.

6. A circuit as described by claim 5, wherein the bulk energy storing capacitor includes:

a first terminal connected in the opposite sense to the bi-directional switching regulator output conductor; and a second terminal connected in the one sense to the current sensor output conductor.

7. A circuit as described by claim 2, wherein:

the multiplier is a four quadrant analog multiplier.

8. A circuit as described by claim 5, wherein the means connected to the coupling means, the bi-directional switching regulator means and the bulk energy storing capacitor includes:

a first diode having an anode connected between the bi-directional switching regulator and the second terminal of the coupling capacitor and a cathode connected to a positive terminal of the bulk energy storing capacitor, and a second diode having a cathode connected between the bi-directional regulator means and the second terminal of the coupling capacitor and an anode connected to a negative terminal of the bulk energy storing capacitor.

* * * * *